Aug. 5, 1930.  C. E. DALE  1,772,210

CASING HEAD PACKING AND OIL SAVER

Filed July 7, 1927

INVENTOR.
C. E. Dale
Watson E. Coleman
ATTORNEY.

Patented Aug. 5, 1930

1,772,210

UNITED STATES PATENT OFFICE

CHARLEY E. DALE, OF BARNSDALL, OKLAHOMA

CASING-HEAD PACKING AND OIL SAVER

Application filed July 7, 1927. Serial No. 204,099.

This invention relates to devices for packing an oil well casing to permit the oil well tube to pass through the casing and prevent any loss of oil.

The general object is to provide a casing head packing device which is hollow and formed of rubber adapted to be expanded against the tube by pneumatic pressure.

A further object is to provide a device of this character which will permit a tubing collar to pass through but will cause the packing means to close tightly around the tubing after the collar has passed through.

A still further object is to provide a device of this character which may be used in any casing head or control head and which may be used with any casing head top or any safety tubing spider of regulation size.

My invention is illustrated in the accompanying drawing, wherein:—

Figure 1:
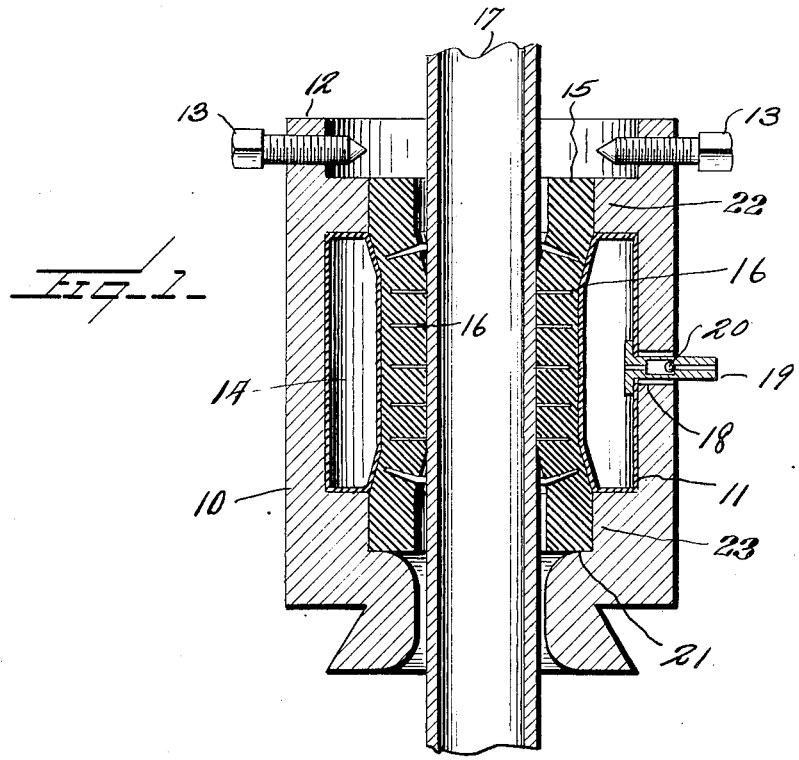
Figure 1 is a vertical sectional view of an oil saver constructed in accordance with my invention.
Figure 2:
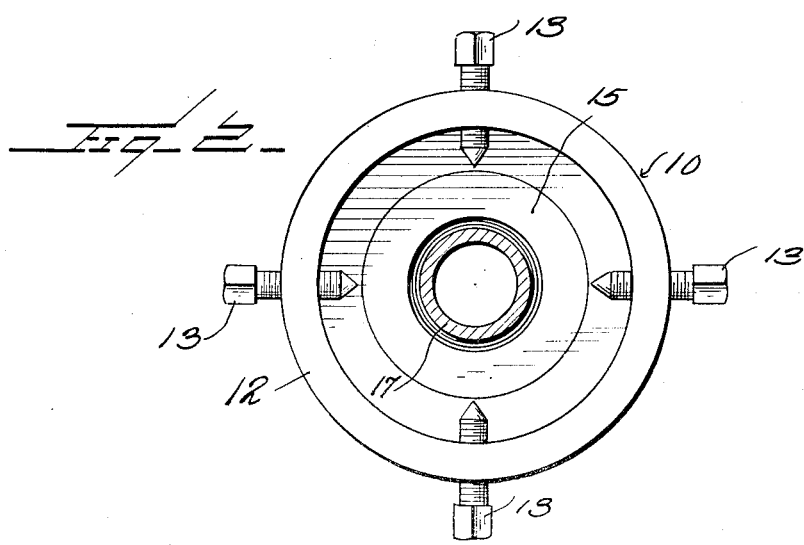
Figure 2 is a top plan view of the construction shown in Figure 1.

Referring to this drawing, it will be seen that I have provided a cylindrical body 10 which is annularly grooved upon its inner face, as at 11, and which has an upwardly extending flange 12 through which four set screws 13 pass whereby this packing device may be secured to a casing head or other like element.

Disposed within the annular groove 11 is an annular pneumatic hose 14, of canvas or like material and having an inner tube 14ª, and attached to the outer face of this hose, which is relatively shallow, is an annular facing piece 15 of relatively thick rubber, this rubber extending above and below the upper and lower walls of the recess or groove 11. The face of this rubber is annularly kerfed, as at 16, and the internal diameter of the rubber is greater than the external diameter of a pipe or tube 17 which is designed to pass through this packing.

The wall of the body 10 is formed with an aperture 18, and disposed in the outer wall of the tube 14 is an air inlet or outlet 19 having therein an inflating valve 20 extending into the inner tube. This is a check valve preventing the air within the hose 14 from escaping but permitting air being forced into the interior of the hose. The body 10 below the facing piece 15 is formed with a shoulder 21 which supports this facing piece.

It will be noted that the annular recess or groove 11 is defined by the inwardly projecting flanges or shoulders 22 and 23, these shoulders or flanges extending inward a distance approximately equal to the thickness of the pneumatic tube 14 when only slightly inflated. It will be seen that the facing piece or packing 15 rests over the inner faces of the shoulders 22 and 23 and that the internal diameter of the packing or facing member 15 is slightly greater than the external diameter of the pipe 17. Thus when the pneumatic tube 14 is deflated, the upper end of the packing has a chance to move upward over the face of the flange or shoulder 22 and move downward over the face of this shoulder as the pneumatic tube is inflated. As a consequence of this the ends of the packing or facing 15 when the pneumatic hose is inflated are disposed in spaced relation to the tube or pipe 17 and the inner face of the packing is thus in effect flared at its ends.

This thus permits the tube 17 to be readily slipped downward even where collars are disposed upon the tube or pipe or where joints are met with. With applicant's device also it is possible to deflate the pneumatic hose 14 whenever a pipe joint encounters the packing or a collar encounters the packing so as to permit the ready passage of the collar if by any chance the collar or joint should not force the packing inward by wedging downward through the expanded opening at the upper end of the packing. Thus the middle portion of the packing may be urged with moderate force against the pipe, but the pipe may be readily slipped downward through the packing or if desired a greater inflation may be secured of the pneumatic hose which will force the packing with greater force against the pipe 17. The downward movement of the pipe cannot shift the packing downward because the packing rests against the seat 21 and if it be desired to withdraw the pipe 17, it is an easy matter to deflate the pneumatic hose and withdraw the packing so as to permit an upward movement of the pipe.

In actual practice, the body 10 will be approximately 10" long and 6¼" outside diameter and have an inside diameter of 3". The grooves or kerfs 16 permit the air pressure to force the rubber packing or facing piece 15 against the tube 17 so as to prevent any escape of oil around the tube, and then as the tube is forced downward into the well, this pneumatic packing will yield so as to permit the passage of the tube collars and yet close immediately over the tube collars.

This construction uses about fifteen pounds of air pressure and enables the operator to tube a well flowing at the rate of from five to fifty barrels per hour with practically no waste at all. The air pressure causes the rubber to last and permits about six thousand feet of tubing to be run without a new rubber. This pneumatic packing can be used on any casing head or control head and is held in place by the four set screws 13. It may be used with any casing head top or any safety tubing spider of regulation size.

I have illustrated this device as adapted to be connected to a regular casing or control head top, the flange at the lower end of the body 10 when inserted in the casing or control head top beng firmly held by means of four set screws. I do not wish to be limited to this arrangement of the parts, however, as the principle of this invention may be applied to packing devices not used in intimate connection with the control head top.

I claim:—

A casing head packing comprising a cylindrical body adapted to be mounted on a casing head of a well, the body being annular in cross section and formed to provide an annular recess less in length than the body, the upper and lower ends of the recess being defined by annular shoulders, the lower end of the body extending inward beyond said lower shoulder to form a packing seat, an annular pneumatic hose disposed within said recess and having means whereby it may be inflated or deflated and an annular packing member disposed within the hose and longer than the hose and having its ends resting against the inner faces of said shoulders and the lower end resting upon said seat, the upper end of the annular packing member being free to move longitudinally of the cylindrical body.

In testimony whereof I hereunto affix my signature.

CHARLEY E. DALE.